United States Patent [19]

Kojima

[11] Patent Number: 5,761,198
[45] Date of Patent: Jun. 2, 1998

[54] TRANSMISSION CONTROL METHOD OF DOWNGOING CONTROL SIGNAL IN TDMA MOBILE COMMUNICATIONS SYSTEM

[75] Inventor: Susumu Kojima, Tokyo, Japan

[73] Assignee: NEC Corporation, Tokyo, Japan

[21] Appl. No.: 531,896

[22] Filed: Sep. 22, 1995

[30] Foreign Application Priority Data

Sep. 22, 1994 [JP] Japan ................................ 6-254790

[51] Int. Cl.⁶ ...................................................... H04J 3/06
[52] U.S. Cl. .................... 370/337; 370/350; 370/508; 375/356; 455/502
[58] Field of Search ............................... 370/310, 315, 370/327, 328, 321, 324, 329, 336, 337, 345, 369, 350, 498, 503, 504, 507, 508, 509, 510, 512, 514, 516, 517, 518, 519, 520, 522; 375/354, 355, 356, 357, 358, 359, 362, 364, 365, 371, 373, 375; 379/61, 63; 455/51.1, 50.1, 49.1, 53.1, 54.1, 63, 67.3, 67.6, 67.7, 68, 69, 70, 92, 134, 139, 226.2

[56] References Cited

U.S. PATENT DOCUMENTS 5,396,496 3/1995 Ito et al. ............................... 370/337
5,430,731 7/1995 Umemoto et al. .................... 370/350
5,448,570 9/1995 Toda et al. ........................... 370/350
5,537,685 7/1996 Matsuno ............................... 370/350

FOREIGN PATENT DOCUMENTS 0 594 342   4/1994   European Pat. Off.
62-108626   5/1987   Japan.
3-241949   10/1991   Japan.
2 249 922   5/1992   United Kingdom.

Primary Examiner—Wellington Chin
Assistant Examiner—Huy D. Vu
Attorney, Agent, or Firm—Foley & Lardner

[57] ABSTRACT

In a method of controlling the transmission of a downgoing control signal, a mobile terminal detects the presence of radio wave of a downgoing control signal in each time slot in response to an inquiry signal received from a base station. The mobile terminal generates an answer signal indicating the time positions of radio waves received within a predetermined interval, and transmits the answer signal to the base apparatus. The base apparatus, receiving the radio condition answer signal, detects time differences between the downgoing control signal sent by the base apparatus itself and other downgoing control signals sent by other base apparatuses. If at least one time difference becomes lower than a predetermined threshold, the base apparatus changes the transmission timing of the downgoing control signal such that the time difference becomes larger than the threshold.

18 Claims, 15 Drawing Sheets

FIG. 12

DATA BITS OF R. C. ANSWER SIGNAL AT TIME INSTANT T1

1st FRAME :  0000000  1000000000000000000000000
2nd FRAME:  0000001  0000000000011000000000000
3rd FRAME :  0000010  0000000000000000000000000
4th FRAME :  0000011  0000000000000000000000000
5th FRAME :  0000100  0000000000000000000000000
6th FRAME :  0000101  0000000000000000000000000
7th FRAME :  0000110  0000000000000000000000000
8th FRAME :  0000111  0000000000000000000000000

(THERE ARE 1s AT BIT NUMBERS 37 AND 38, RESPECTIVELY)

FIG. 13

DATA BITS OF R. C. ANSWER SIGNAL AT TIME INSTANT T2

1st FRAME :  0000000  1000000000000000000000000
2nd FRAME:  0000001  0011000000000000000000000
3rd FRAME :  0000010  0000000000000000000000000
4th FRAME :  0000011  0000000000000000000000000
5th FRAME :  0000100  0000000000000000000000000
6th FRAME :  0000101  0000000000000000000000000
7th FRAME :  0000110  0000000000000000000000000
8th FRAME :  0000111  0000000000000000000000000

(THERE ARE 1s AT BIT NUMBERS 28 AND 29, RESPECTIVELY)

FIG. 16

DATA BITS OF R. C. ANSWER SIGNAL OF MOBILE TERMINAL 3
AT THE TIME OF CONFIRMATION AFTER TRANS. TIMING IS CHANGED

1st FRAME :  0000000  1000000000000000000000000

2nd FRAME:   0000001  0000000000000000000000000

3rd FRAME :  0000010  0000000000000000000000000

4th FRAME :  0000011  0000000000000000000000001

5th FRAME :  0000100  1000000000000000000000000

6th FRAME :  0000101  0000000000000000000000000

7th FRAME :  0000110  0000000000000000000000000

8th FRAME :  0000111  0000000000000000000000000

(THERE ARE 1s AT BIT NUMBERS 99 AND 100, RESPECTIVELY)

TRANSMISSION CONTROL METHOD OF DOWNGOING CONTROL SIGNAL IN TDMA MOBILE COMMUNICATIONS SYSTEM

BACKGROUND OF THE INVENTION

The present invention relates to a TDMA (Time Division Multiple Access) mobile communications system which performs control of call connection by using control signals of a predetermined radio frequency, and in particular to a control method of transmission of a downgoing control signal from base stations to a mobile terminal without synchronizing to a single clock.

DESCRIPTION OF THE RELATED ART

In a digital cordless telephone system according to the standard (RCR STD-28) of Research & Development Center for Radio Systems, respective base apparatuses use a pre-determined radio frequency to transmit downgoing control signals to mobile terminals in burst mode. In such a system, by determining the transmission timing of downgoing control signals between base apparatuses in accordance with a clock source, the conflict of the downgoing control signals can be easily prevented. For instance, there may be proposed a system where a base apparatus connected to the ISDN (Integrated Services Digital Network) line extracts the clock from the ISDN line signal to decide the transmission timing of the downgoing control signal.

However, in the digital cordless telephone system installed in a home, its base apparatus is usually connected with an analog telephone network. Since the base apparatus cannot extract the clock from the analog telephone line, respective base apparatuses transmit the control signals to mobile terminals according to independent clocks. In other words, asynchronous transmission of control signals is inevitably made in such a system, causing a problem of the conflict of downgoing control signals which originates in the clock-frequency difference between the base apparatuses.

As illustrated in FIG. 1, two or more base apparatuses are connected with the analog telephone network 1 and a plurality of mobile terminals are connected with the nearest base apparatus through a radio channel. Here, a mobile terminal A is assumed to be located at a position where respective control signals transmitted by the base apparatuses A and B are received at an equal level.

FIG. 2 is a timing chart to explain the control signal conflict in the conventional system. Relative transition of the transmission timing in the base apparatuses A and B is shown based on the control signal transmission timing of the base apparatus A. Here, the clock frequency of the base apparatus B is assumed to be higher than that of the base apparatus A. Since the downgoing control signals transmitted by the base apparatuses A and B come into conflict with each other at time T3, the mobile terminal A cannot receive the downgoing control signals. Therefore, even if the base apparatus A transmits an incoming call signal to the mobile terminal A at this time, the base apparatus A cannot establish the incoming call connection with the mobile terminal A because the mobile terminal A cannot receive the incoming call signal.

Methods of avoiding the failure of such incoming call connections are proposed as follows: a) the base apparatus are sending the control signal repeatedly until the control signal does not conflict with another control signal, and b) the base apparatus makes the sending interval of the control signal random. Employing the second method (2), even if the transmission overlaps at a time instant, the conflict probably fades out at the next time instant.

A method for eliminating the conflict of acknowledge signals sent from mobile terminals by using a time-division control channel is described in Japanese Patent Laid-open No. 62-108626. Another method for eliminating the conflict of radio waves by using a time-division control channel through which calling signals are transferred from a switching system to a plurality of connection apparatuses with delaying successively is described in Japanese Patent Laid-open No. 3-241949.

However, according to the first method (a), the base apparatus transmits the control signal to mobile terminals repeatedly until the control signal does not conflict with another, resulting in delayed connection.

Especially, in cases where there is little difference between the clock frequencies of the base apparatuses, since the downgoing control signals overlap with each other for a very long time, any connection cannot be established during the long conflict period. Moreover, according to the second method (b), since the downgoing control signals are not transmitted at a constant interval, the efficient battery-saving cannot be achieved in a mobile terminal.

SUMMARY OF THE INVENTION

An object of the present invention is to provide a transmission control method which can avoid a conflict between downgoing control signals sent from base apparatuses to a mobile terminal so as to achieve a steady TDMA mobile communication.

Another object of the present invention is to provide a method of controlling the transmission timing of a control signal so that the control signal can be prevented from overlapping with other control signals in a mobile communications system where the respective base apparatuses are provided with independent clock sources which are working asynchronously.

A transmission control method according to the present invention is implemented in a TDMA mobile communications system in which a mobile terminal is located within service areas provided by a plurality of base stations each independently transmitting a control signal of a predetermined radio frequency at first predetermined intervals. After synchronizing with a first control signal received from a first base station to allocate time slots in a first predetermined interval, the mobile terminal determines whether a radio wave of the predetermined radio frequency exists in each time slot or not, and generates radio condition data of all the time slots. A radio condition signal including the radio condition data is transmitted to the first base station. Using the radio condition data received from the mobile terminal, the first base station detects a first time interval between adjacent time slots associated with said first base station and another base station. When the first time interval is smaller than a predetermined value, the first base station changes in transmission timing of the first control signal such that the first time interval becomes larger than the predetermined value.

Preferably, the presence of the radio wave in each time slot is determined by the following steps: detecting radio-field strength of the radio wave at a plurality of time positions included in each time slot; comparing the radio-field strength with a predetermined threshold; and determining that the radio wave exists in a time slot only when the radio-field strength is not smaller than the predetermined threshold at one or more of the time positions included in the time slot.

More specifically, the transmission timing of the first control signal is changed as follows. The base station, using the radio condition data received from the mobile terminal, detects time intervals between adjacent time slots associated with the base stations, respectively. Subsequently, the base station detects the longest time interval among the time intervals when the first time interval is smaller than the predetermined value, and changes a transmission time position of the first control signal to the center of the longest time interval.

In accordance with another aspect of the present invention, a first base apparatus may transmit a radio condition inquiry signal as a control signal to a mobile terminal in predetermined intervals. In this case, the mobile terminal detects the presence of radio wave of a control signal in each time slot in response to the inquiry signal received from the first base apparatus. The mobile terminal generates a radio condition answer signal which indicates the time positions of radio waves received within the predetermined interval, and transmits the radio condition answer signal to the first base apparatus. The first base apparatus, receiving the radio condition answer signal from the mobile terminal, detects time differences between the downgoing control signal sent by the first base apparatus itself and other downgoing control signals sent by other base apparatuses. If at least one time difference becomes lower than a predetermined threshold, the first base apparatus changes the transmission timing of the downgoing control signal such that the time difference becomes larger than the threshold.

By performing such an operation at the predetermined intervals, the differences in transmission time between base apparatuses are always kept larger than the threshold, resulting in no conflict with each other. Therefore, a stable TDMA mobile communication can be achieved.

BRIEF DESCRIPTION OF THE DRAWINGS

FIG. 12 is a diagram showing data bits of a radio condition answer signal sent back from a mobile terminal at a time instant T1 of FIG. 11;

FIG. 13 is a diagram showing data bits of a radio condition answer signal sent back from a mobile terminal at a time instant T2 of FIG. 11;

FIG. 16 is a diagram showing data bits of a radio condition answer signal just after the transmission timing is changed.

DETAILED DESCRIPTION OF THE PREFERRED EMBODIMENTS

Figure 1:
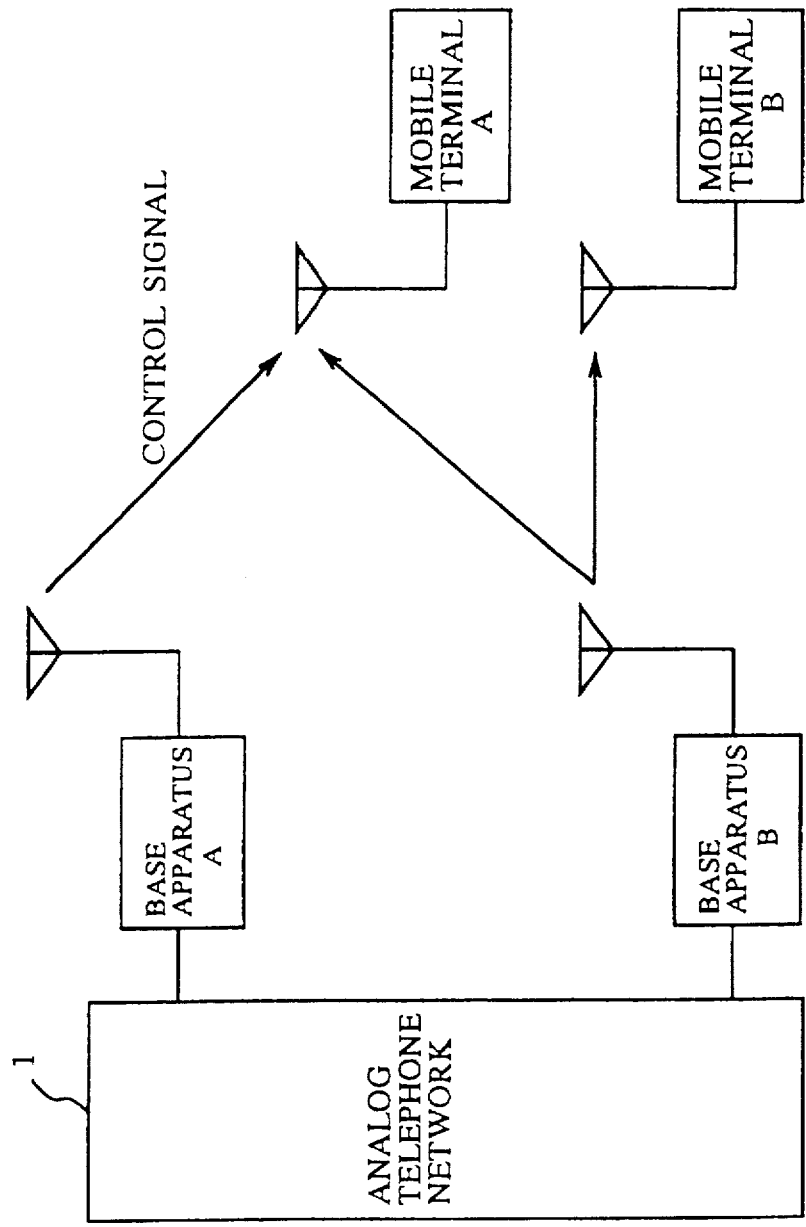
FIG. 1 is a schematic block diagram showing a conventional cordless telephone system.
Figure 2:
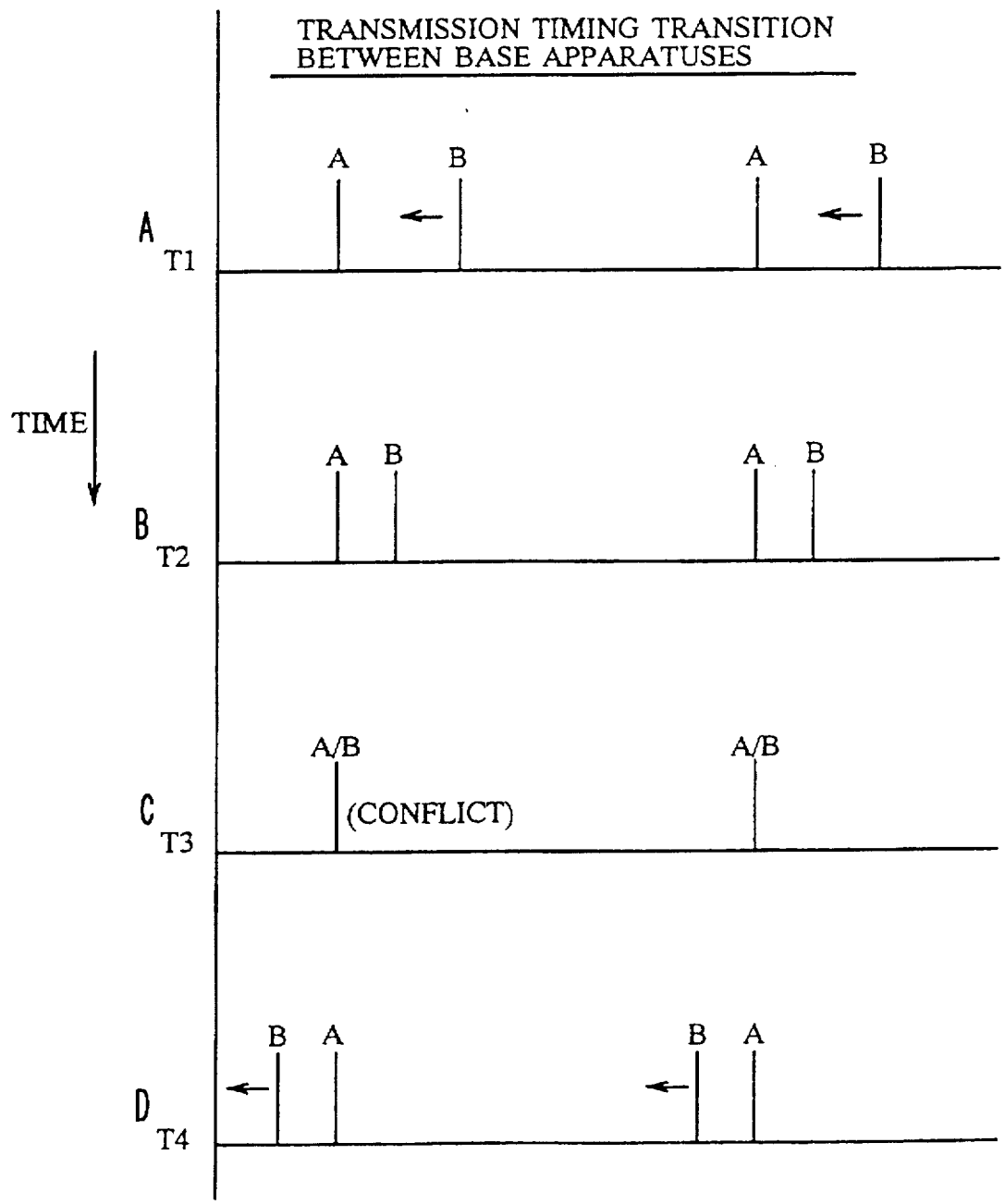
FIG. 2 is a timing chart showing the conflict of downgoing control signals in the system of FIG. 1.
Figure 3:
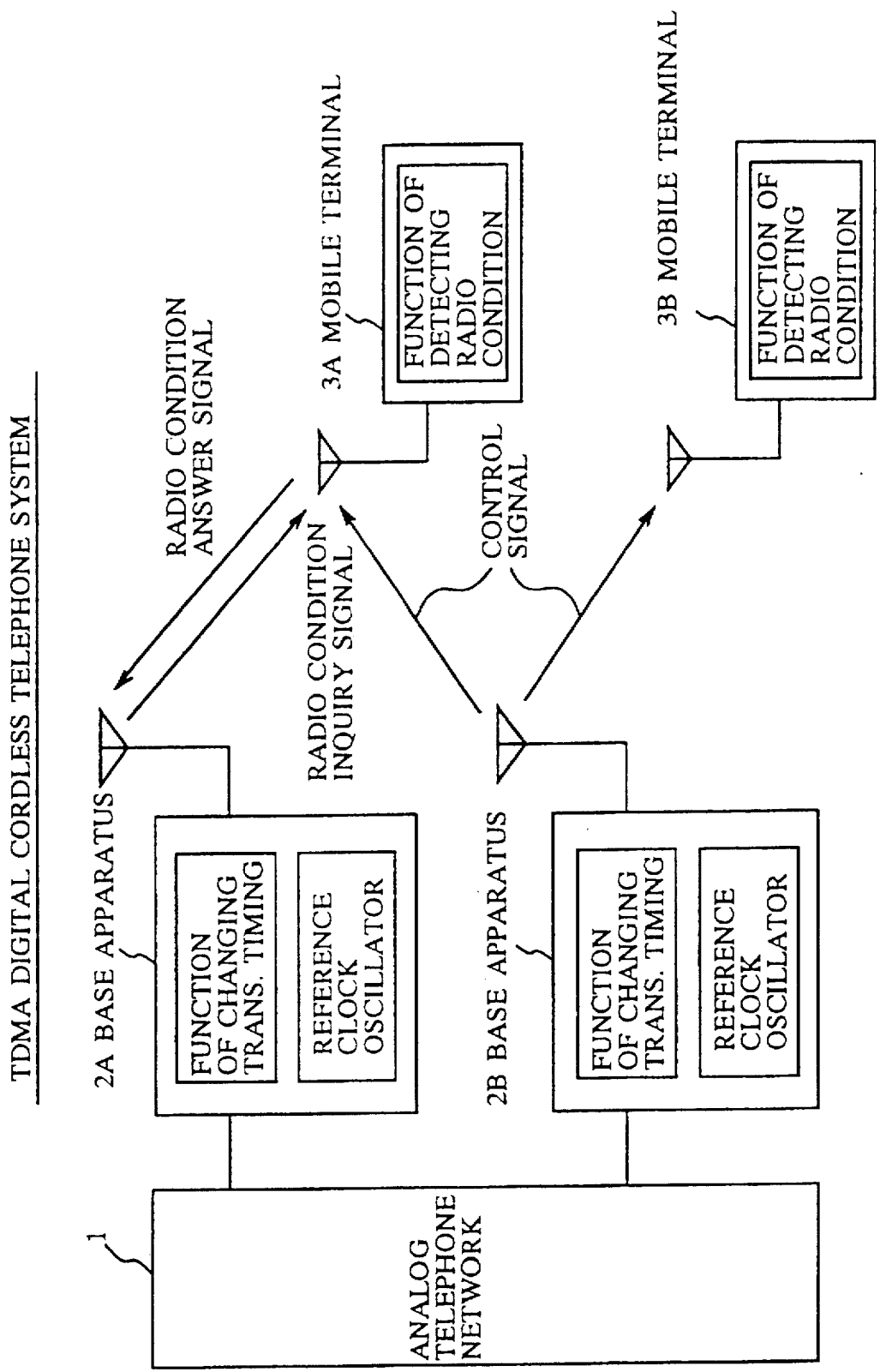
FIG. 3 is a schematic block diagram illustrating a digital cordless telephone system according to an embodiment of the present invention.

Referring to FIG. 3, by way of example, two adjacent base apparatuses 2A and 2B are connected with the existing analog telephone network 1. The respective base apparatuses 2A and 2B have individual reference clock oscillators which are designed to work with a period of 125 milliseconds but actually have slight variations in frequency. Based on the clock frequencies of the reference clock oscillators, the respective base apparatuses 2A and 2B transmit control signals of a predetermined radio frequency intermittently to mobile terminals 3A and 3B. Each base apparatus also has a function to change the transmission timing of the control signal according to the radio condition of a mobile terminal. The respective mobile terminal 3A and 3B, in response to a radio condition inquiry signal received from a base apparatus, judge whether the radio wave of any control signal exists in each slot. The result is sent back to the base apparatus as a radio condition answer signal. A radio connection between a base apparatus and mobile terminals complies with the standard (RCR STD-28).

In this example, it is assumed that the clock frequency of the base apparatus 2B is higher than that of the base apparatus 2A. In addition, the mobile terminal 3A is assumed to be located at the position where the respective radio waves of control signals are received from the base apparatuses 2A and 2B at an approximately equal radio-field strength.

Figure 4:
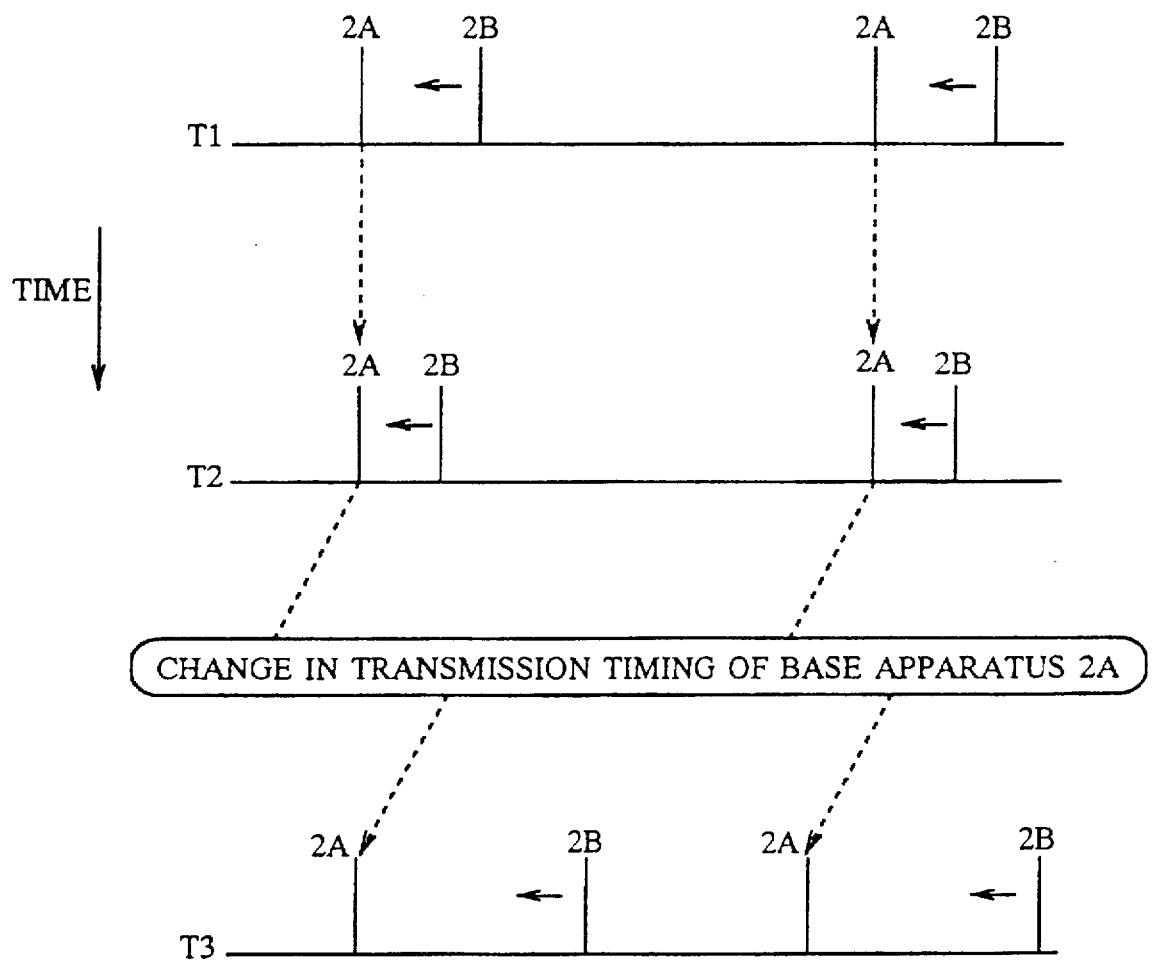
FIG. 4 is a timing chart illustrating a transmission timing control according to the embodiment.

As shown in FIG. 4, the transmission timing in the base apparatus 2B is approaching that of the base apparatus 2A. At the time instant T1, according to a radio condition answer signal received from the mobile terminal 3A, the base apparatus 2A judges that the distance of the transmission timing (2A) from the transmission timing (2B) is sufficiently larger than a predetermined threshold value. Therefore, the base apparatus 2A does not change the transmission timing of the control signal.

At the time instant T2, however, a transmission time difference between the base apparatuses 2A and 2B is nearing the threshold value. At this time, upon receipt of the radio condition answer signal from the mobile terminal 3A, the base apparatus 2A starts the transmission timing change control so as to avoid conflicting with the downgoing control signal (2B) of the base apparatus 2B at the mobile terminal 3A. After changing the transmission timing (2A), the base apparatus 2A inquires the radio condition of the mobile terminal 3A again. As a result, it is confirmed that the transmission time difference with other base apparatuses is sufficiently large as shown at the time instant T3. In this way, the transmission time interval of control signals between base apparatuses is kept at a predetermined distance at all times, which can prevent a control signal from colliding with the others.

Next, the respective circuits of a base apparatus and a mobile terminal will be explained in detail hereinafter. The embodiment employs TDMA/TDD (Time Division Multiple Access/Time Division Duplex) scheme complying with the radio standard of RCR STD-28. An ADPCM codec encodes and decodes speech signals and a digital signal multiplexing/demultiplexing circuit performs a framing process in accordance with RCR STD-28.

Figure 5:
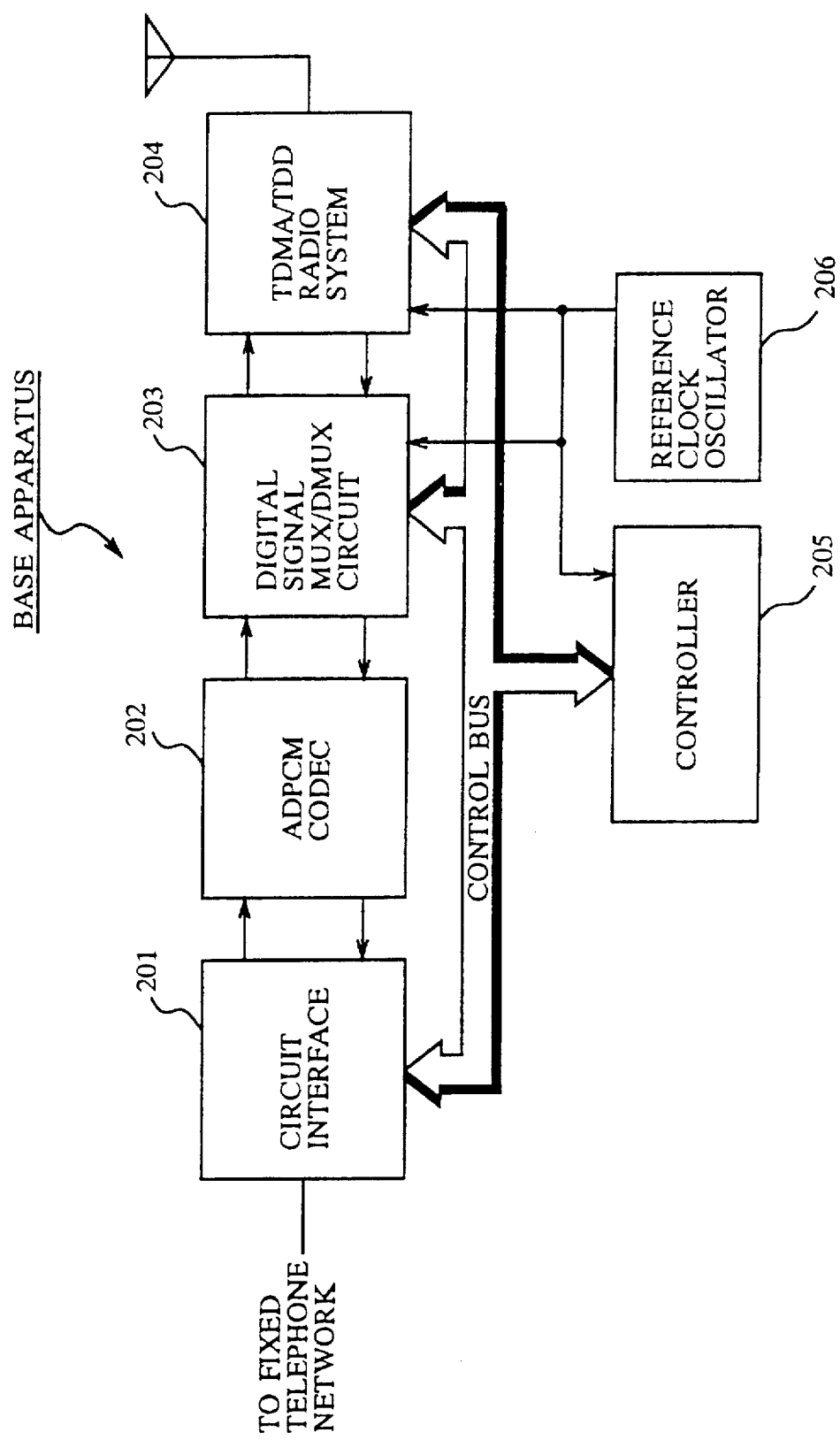
FIG. 5 is a detailed block diagram showing the configuration of a base apparatus in the embodiment.

As illustrated in FIG. 5, a base apparatus is comprised of a circuit interface 201 connected with the telephone network, an ADPCM codec 202, a digital signal multiplexing/demultiplexing circuits 203, and a TDMA/TDD radio system 204. The operations such as the transmission of a downgoing control signal and the transmission timing change are controlled with a controller 205 in this embodiment. The transmission timing of a downgoing control signal is decided based on the clock supplied by a reference clock oscillator 206.

Figure 6:
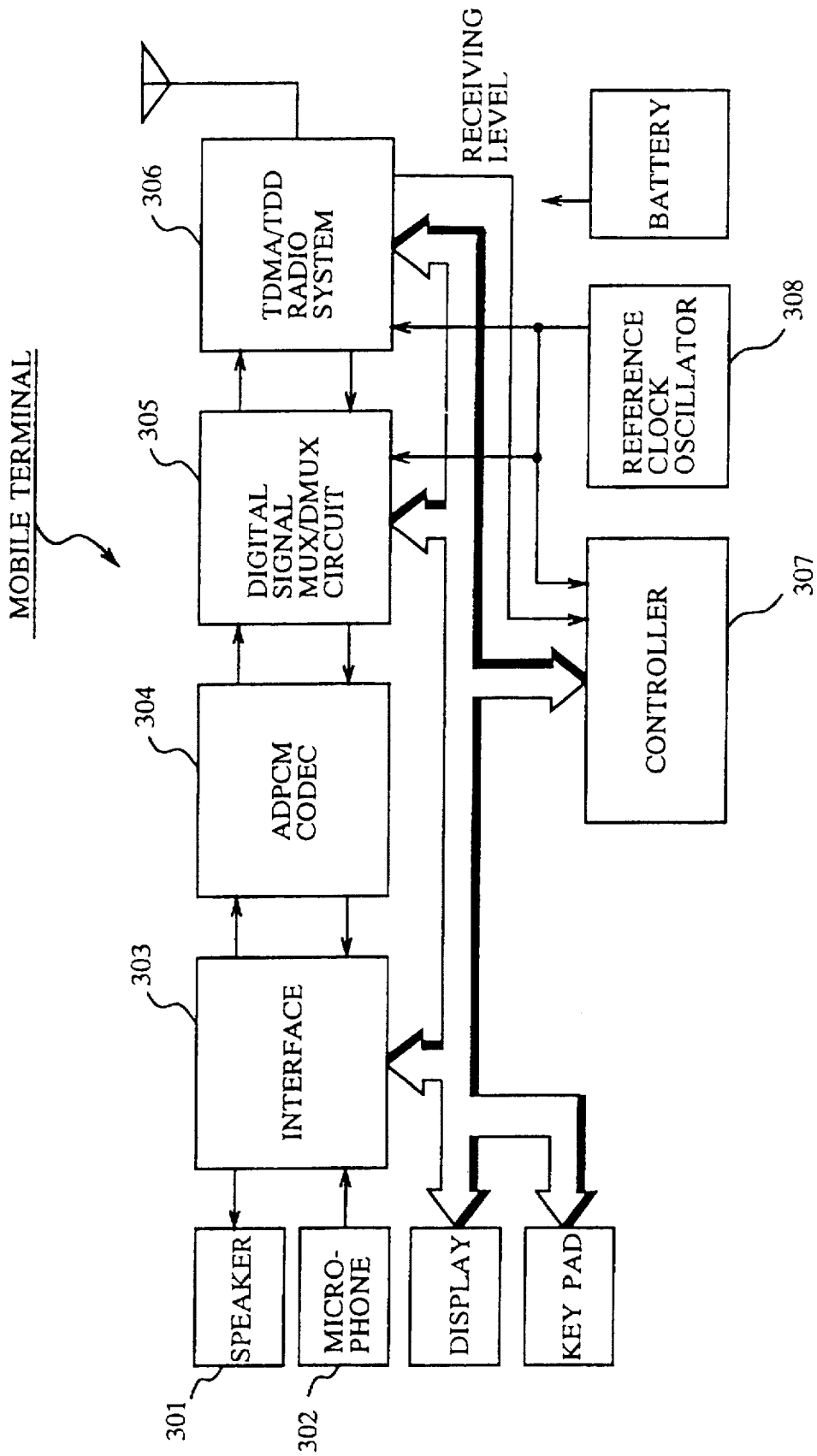
FIG. 6 is a detailed block diagram showing the configuration of a mobile terminal in the embodiment.

As illustrated in FIG. 6, a speaker 301 and a microphone 302 of a mobile terminal are connected with an ADPCM codec 304 through a telephone call interface 303. The ADPCM codec 304 performs encoding and decoding of speech signals. The encoded speech signal is input to the digital signal multiplexing/demultiplexing circuit 305 and is transmitted through the TDMA/TDD radio system 306. On the other hand, a radio wave is received by the TDMA/TDD radio system 306 and is demultiplexed with the digital signal multiplexing/demultiplexing circuit 305. After being demultiplexed, the received signal is decoded by the ADPCM codec 304. The reception level of the received radio wave is measured with a radio-field strength detector (not shown) which is, as known well, provided in the TDMA/TDD radio system 306. The controller 307 reads the measurement value of the received radio wave strength, decides whether the radio wave of any control signal exists or not using the measurement, and generates answer information which is comprised of data bits indicating the presence of radio wave. Moreover, the timing of operations such as described above is decided based on the clock supplied by the reference clock oscillator 308.

The base apparatus and the mobile terminal each decide the operation timing based on the reference clock supplied by the reference clock oscillator as mentioned above. Therefore, transmission timing of the downgoing control signal in each base apparatus is decided by this reference clock.

The base apparatus in this embodiment is designed to transmit eight control signals per second intermittently (every 125 milliseconds) in accordance to independent clock timing. However, since each base apparatus decides the transmission time of the control signal according to the independent reference clock, the transmission timing is gradually shifted in steps of a period stemming from the accuracy error of each reference clock for the design period of 125 milliseconds. (See FIG. 4.)

For simplicity, it is assumed that the reference clock frequency of the base apparatus 2A is equal to the design value and the transmission interval of downgoing control signals is just 125 millisecond. On the other hand, it is assumed that the reference clock frequency of the base apparatus 2B is only 1 part per million (ppm) higher than the design frequency. That is, the transmission interval of downgoing control signals in the base apparatus 2B is 1/1,000,000 narrower than the design period of 125 milliseconds.

For instance, it is assumed that the base apparatus 2B transmits a control signal fifty (50) milliseconds after the base apparatus 2A transmits a control signal to the mobile terminal 3A. In this case, if the timing is not changed as prior art, the control signals which both base apparatuses 2A and 2B transmit conflict with each other after 50,000 seconds, that is, about 14 hours from that time. Moreover, since the length of a control signal is about 570 micro second, the overlap period of both control signals continues for about 570 seconds, that is, about as many as 9.5 minutes. During such an overlap period, no call connection can be made.

The operations of a base apparatus and a mobile terminal in this embodiment will be explained hereinafter.

OPERATION OF BASE APPARATUS

Figure 7:
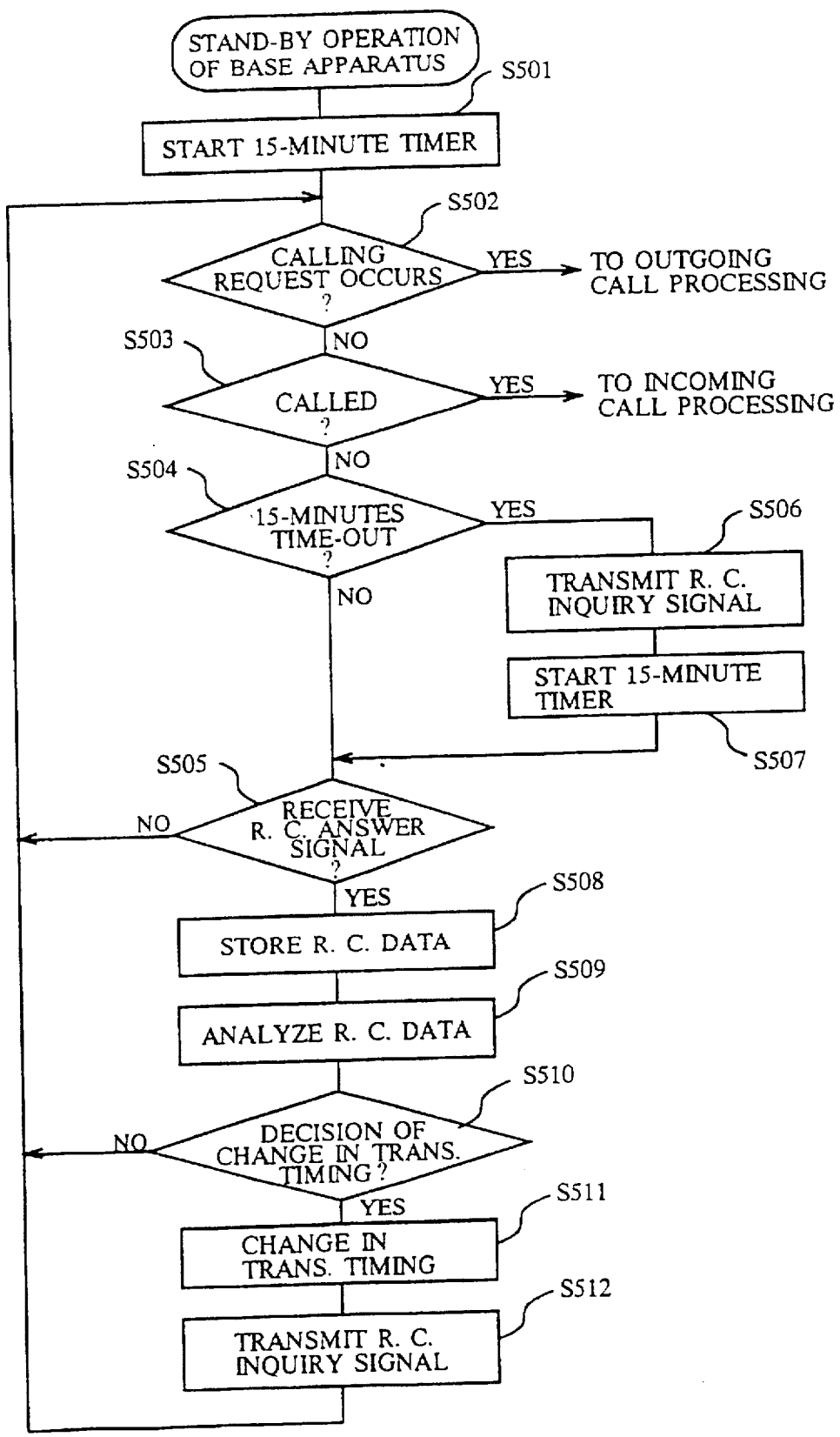
FIG. 7 is a flow chart showing the operation of a base apparatus in this embodiment.

Referring to FIG. 7, in this embodiment, the base apparatus transmits a radio condition inquiry signal regularly every about 15 minutes. The radio condition inquiry signal is a signal of a downgoing physical slot for control. The radio condition inquiry signal is defined by using the value of CI specified for an option in the CI coding rule of RCR STD-28.

Moreover, the reason why the cycle is 15 minutes is as follows in this embodiment. In RCR STD-28, it is required that transmission is done within the accuracy of 5 ppm. Therefore, when thinking about two or more base apparatuses, the maximum frequency difference between base apparatuses is 10 ppm. If there is a frequency difference of 10 ppm, a difference in transmission timing between base apparatuses is shortened by 9 millisecond per 15 minutes. Therefore, by transmitting a radio condition inquiry signal every 15 minutes, the transmission timing can be controlled such that the transmission time difference between the base apparatus and other base apparatuses is kept at more than 10 milliseconds.

Referring to FIG. 7, first of all, the base apparatus starts a 15-minute timer (S501). If there are neither a calling request nor an arrival of a message (No of S502 and No of S503), the standby state of the base apparatus continues until the 15-minute timer reaches the set time (No of S504 and No of S505). When the time of 15 minutes passes (Yes of S504), a radio condition inquiry signal is transmitted to the mobile terminal (S506) and the 15-minute timer is started (S507). And then the base apparatus waits to receive a radio condition answer signal from a mobile terminal (No of S505).

When the radio condition answer signal is received from the mobile terminal (Yes of S505), the radio condition information on the mobile terminal is memorized (S508) and analyzed (S509). And, if it is necessary to change timing of the transmission of downgoing control signals (Yes of S510), the controller 205 controls the radio system 204 such that the transmission timing of control signals is changed (S511). The timing change routine will be explained in more detailed later. After the transmission timing has been changed, the radio condition inquiry signal is transmitted again for confirmation (S512). A usual calling processing or incoming call processing is done if there is a calling request or arrival of a message (Yes of S502 or Yes of S503).

OPERATION OF MOBILE TERMINAL

Figure 8:
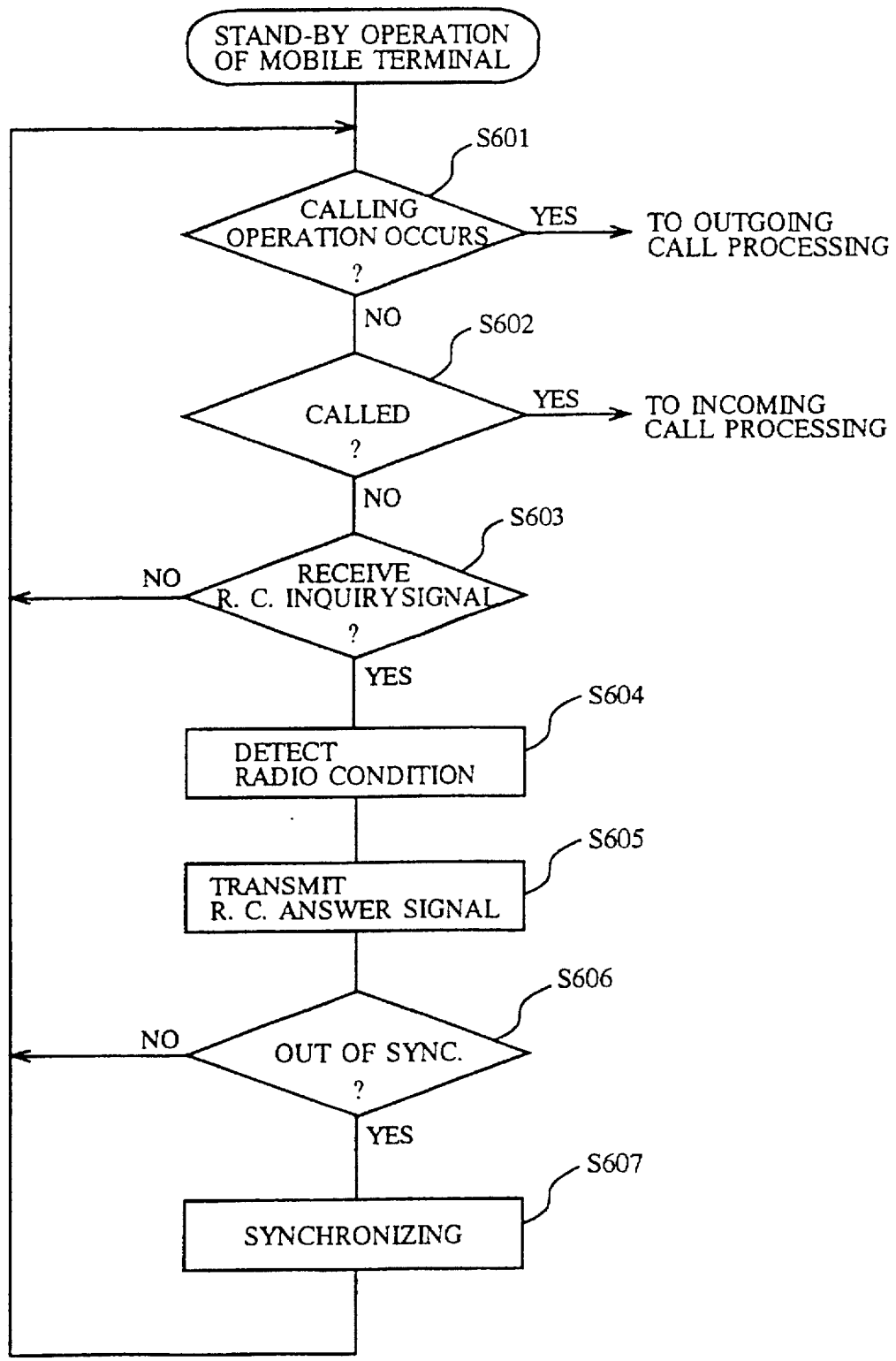
FIG. 8 is a flow chart showing the operation of a mobile terminal in this embodiment.

Referring to FIG. 8, upon receipt of the radio condition inquiry signal from a base apparatus, a mobile terminal starts the operation of radio wave detection and answer formation. If there is no calling operation and no call signal is received (No of S601 and No of S602), the mobile terminal enters the standby state of a radio condition inquiry signal (No of S603).

When receiving the radio condition inquiry signal from the base apparatus (Yes of S603), the mobile terminal detects the presence of a radio wave in each of slots which are allocated during the period of 125 milliseconds after the reception timing of a control signal (S604). The radio condition data indicating the presence of radio wave in each slot is transmitted to the base apparatus as a radio condition answer signal (S605). When the transmission of the radio condition answer signal is completed, it is checked whether the synchronization is established or not (S606). If out of synchronization, the mobile terminal performs a synchronization operation and then returns to the standby operation.

It is to be noted that the synchronization operations S606 and S607 are necessary for synchronizing with a new timing in cases where the base apparatus changes the transmission timing of a control signal, as described later, for the purpose of causing the mobile terminal to perform a receiving operation with battery-saving in synchronization with the timing of a control signal received from the base apparatus.

DETECTION OF THE PRESENCE OF RADIO WAVE

The presence of a control signal in each slot is detected by the controller 307 reading a reception level from the radio-field strength detector incorporated in the radio system 306.

Figure 9:
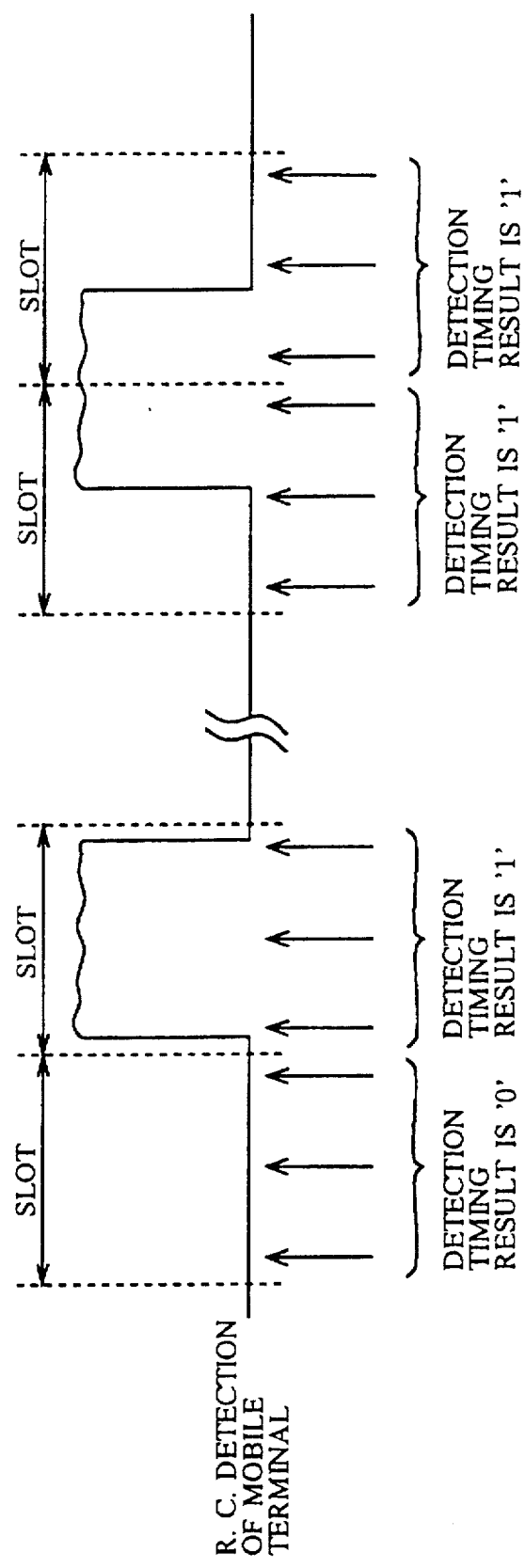
FIG. 9 is a diagram showing a wave form to explain a detection method of the presence of radio waves in a mobile terminal.

As illustrated in FIG. 9, detection of the received radio condition is made according to three different points in each time slot (former edge, center, and post-edge). These time points are set by the controller 307 which recognizes each slot according to the clock received from the reference clock oscillator 308. The controller 307 compares a predetermined threshold with the radio-field reception level values obtained in accordance with the three time points. A slot is judged as having a radio wave, which is indicated with the value '1', if at least one reception level value in the slot is equal to or larger than the threshold. If all three reception level values are less than the threshold, the slot is judged as having no radio wave, which is indicated with the value '0'. In this way, the radio condition data is generated for each slot from the 1st slot to the 200th.

RADIO CONDITION ANSWER SIGNAL

Figure 10A:
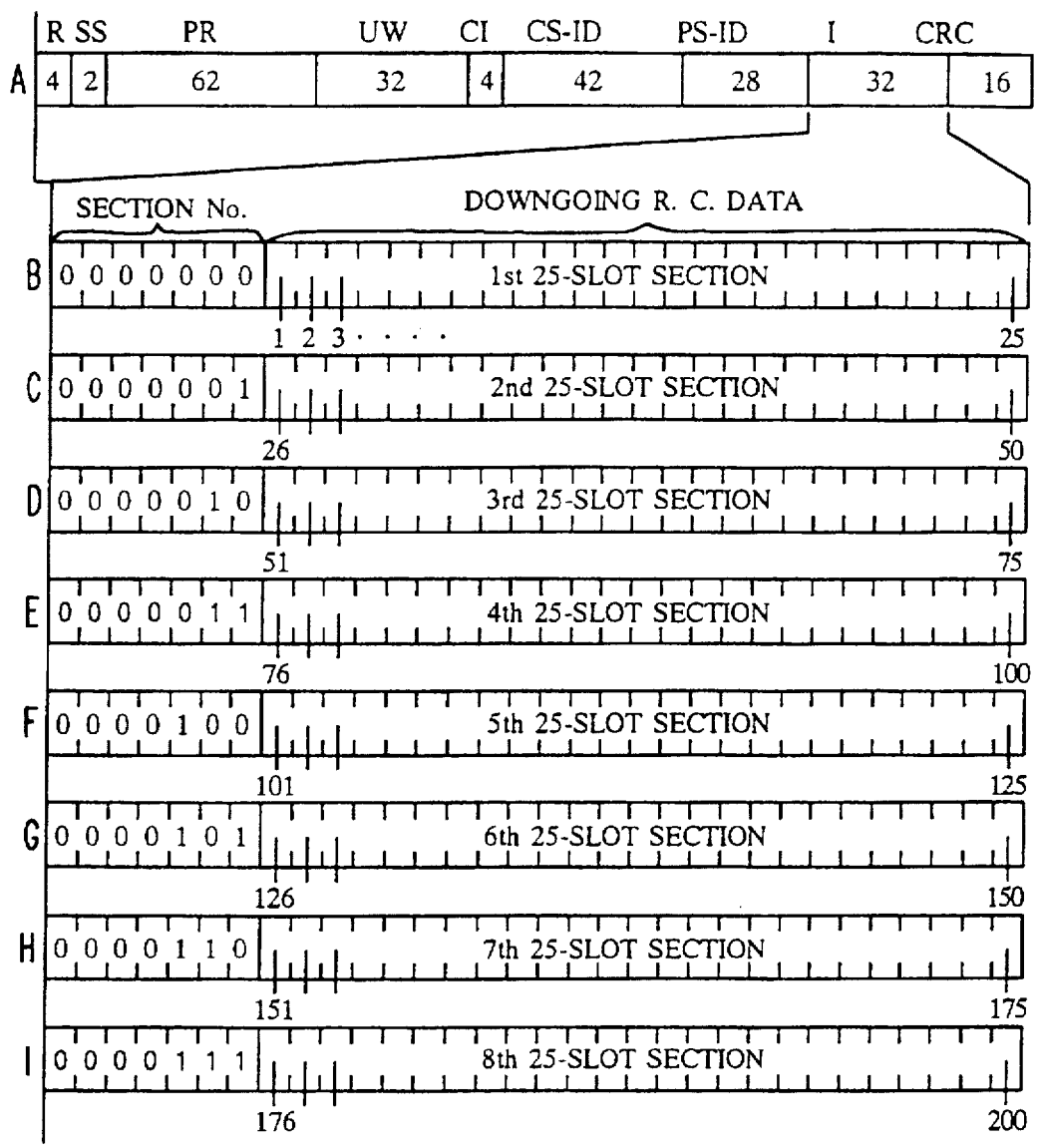
FIG. 10A is a diagram showing a frame configuration of a radio condition answer signal sent from the mobile terminal to the base apparatus.
Figure 10B:
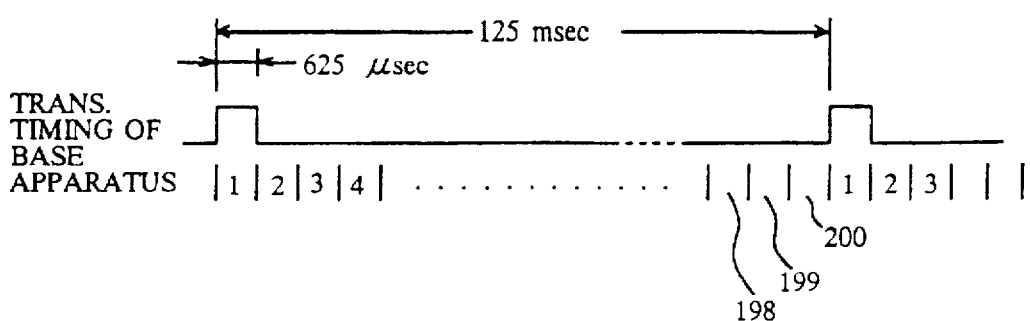
FIG. 10B is a time chart showing the slot allocation during a transmission interval of the base apparatus.

Referring to FIGS. 10A and 10B, in the present embodiment, the transmission interval of the base apparatus is 125 millisecond cycle and includes 200 slots each having 625 microseconds. A radio condition answer signal is a signal of an upgoing physical slot for control. The radio condition answer signal is defined by using the value of CI specified for an option in the CI coding rule of RCR STD-28. The information (I) field, 32 bits, of a radio condition answer signal consists of a frame number of first seven bits and a data field of the remaining 25 bits for conveying radio condition data in each 25-slot section.

As described above, receiving the radio condition inquiry signal, the mobile terminal 3A observes the current radio condition for 125 milliseconds after when the radio condition inquiry signal is received. The controller 307 checks whether a radio wave exists in each slot by comparing the reception level of the slot with the threshold, and represents the result as one bit of the value 1 or 0. Therefore, 200 bits of data are required to indicate the radio condition of 200 slots. As shown in FIG. 10A, since 25 slots are allocated to one signal frame, 8 signal frames are required to inform the base apparatus 2A of the current radio condition of the mobile terminal 3A.

The 200 data bits of the information fields (I) over 8 frames are associated with 200 slots existing during the transmission interval of the base apparatus by the mobile terminal performing the frame synchronization. More specifically, as shown in FIG. 10B, when a certain mobile terminal synchronizes with the transmission interval of 125-millisecond of the base apparatus, the first bit indicating the presence of radio wave has the value '1'. Because the synchronized timing of the mobile terminal is corresponding to the transmission slot of the base apparatus with which the mobile terminal is frame-synchronizing. Similarly, the remaining data bits from the 2nd up to the 200th each indicating the presence of radio wave sequentially correspond to the slots each having 625 microseconds width.

EXAMPLE OF RADIO CONDITION DATA

Figure 11:
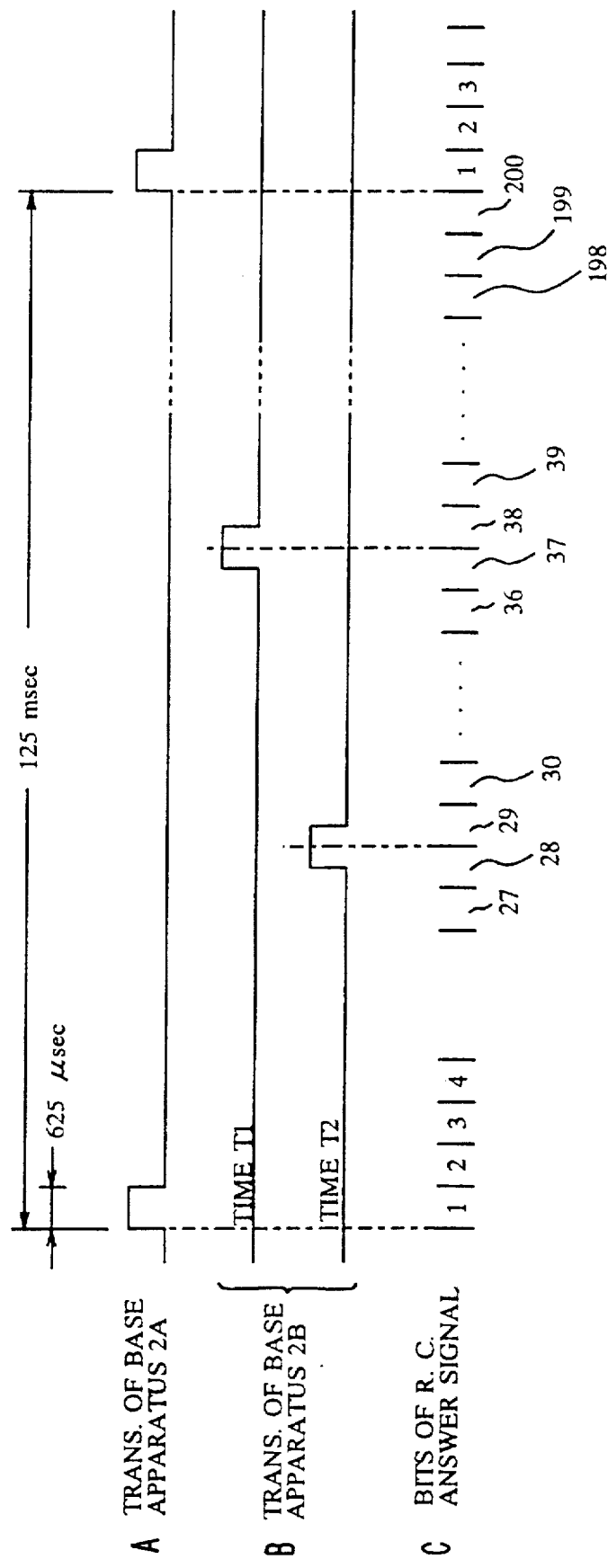
FIG. 11 is a time chart showing the transmission timing of each base apparatus in the system of FIG. 3.

Referring to FIG. 11, the transmission time points of the base apparatus 2B at time T1 and time T2 are shown respectively based on the transmission timing of the base apparatus 2A. In this example, at time T1, the base apparatus 2B transmits a downgoing control signal which is located in time over the 37th and 38th slots of the mobile terminal. At time T2, the base apparatus 2B transmits the downgoing control signal which exists over the 28th and 29th slots.

As shown in FIG. 12, at time T1 of FIG. 11, the controller 307 generates the radio condition data in which the data bits of bit numbers 37 and 38 have the value '1' and the other bits have the value '0'. Receiving the radio condition answer signal from the mobile terminal at time T1, the base apparatus 2A determines that the transmission timing of another base apparatus (in this case, the base apparatus 2B) exists about 22 milliseconds (625 microseconds×36) after transmitting a control signal.

As shown in FIG. 13, at time T2 of FIG. 11, the controller 307 generates the radio condition data in which the data bits of bit numbers 28 and 29 have the value '1' and the other bits have the value '0'. In this embodiment, the time interval of T1 and T2 is 15 minutes during which the transmission timing of the base apparatus 2B shifts closer to that of the base apparatus 2A by about 5.6 milliseconds or about 9 slots. In other words, the base apparatus 2A determines that the other base apparatus 2B transmits a control signal about 17 milliseconds (625 microseconds×27) after transmitting a control signal.

TRANSMISSION TIMING CHANGE IN BASE APPARATUS

Figure 14:
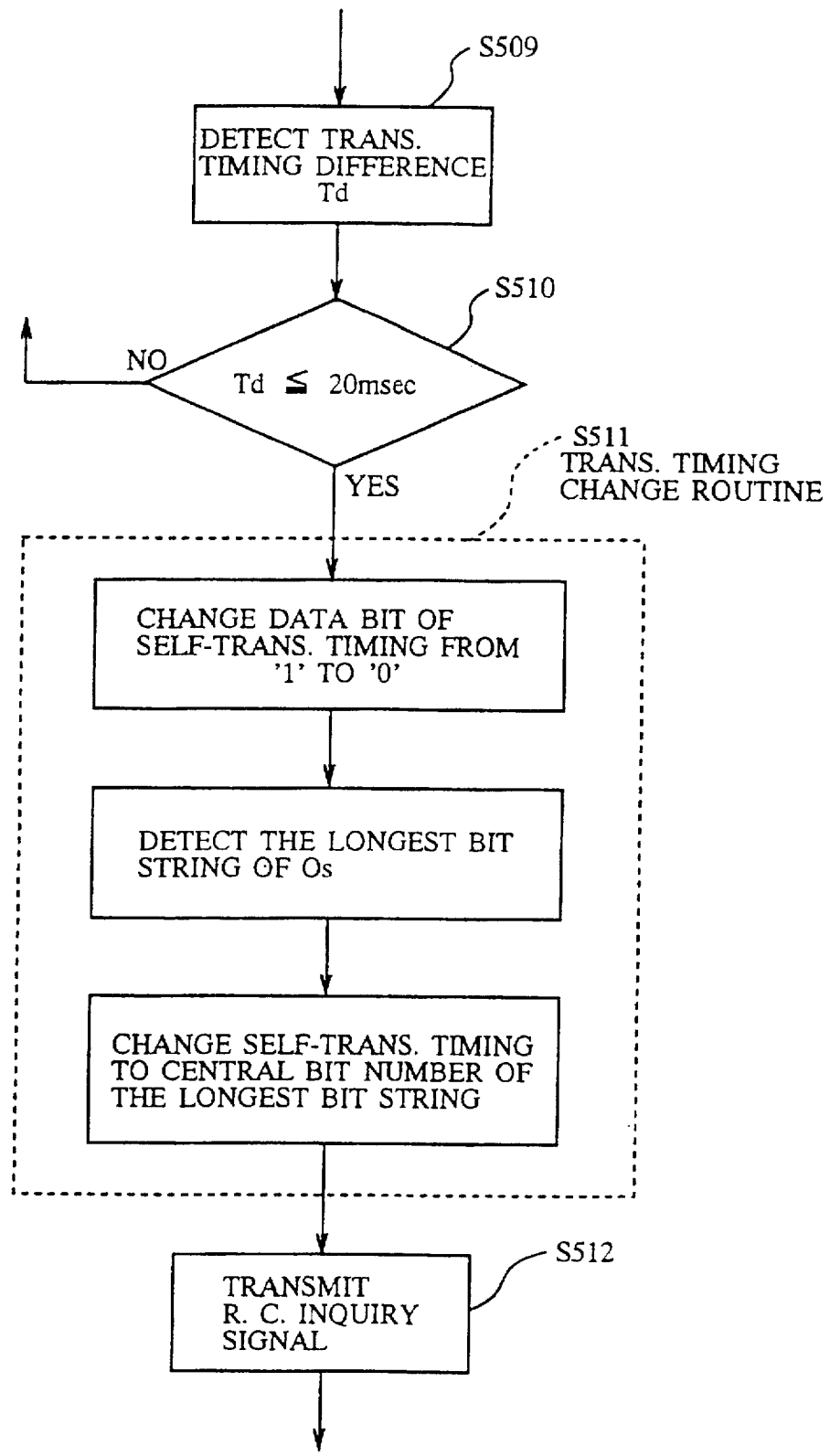
FIG. 14 is a detailed flow chart of the steps S509 to S512 in FIG. 7.

Referring to FIG. 14, when receiving the radio condition answer signal from the mobile terminal, the controller 205 of the base apparatus 2A detects a difference Td in transmission timing between the base apparatus 2A and the base apparatus 2B on the basis of the data bits of the information field of the radio condition answer signal (S509). In the example of the radio condition answer signal as mentioned above, the time difference Td is about 22 milliseconds at time T1 and about 17 milliseconds at time T2. Subsequently, it is checked whether the detected time difference Td is larger than 20 milliseconds (S510). If not larger than 20 milliseconds (Yes of S510), the controller 205 of the base apparatus 2A changes the transmission timing so as to prevent the control signal from conflicting with the other (S511). Since the time difference Td is about 17 milliseconds at time T2, at this time the transmission timing is changed. Where the transmission timing of the base apparatus 2A is changed is decided as follows. First, since the data bit of bit number 1 is of the base apparatus 2A itself, the base apparatus 2A replaces it with the value '0'. Second, the controller 205 detects the longest bit string of 0s from all the 200 bits as would be formed into a loop. Finally, a time position corresponding to the bit number at the center of the longest bit string of 0s is decided as new transmission timing.

More specifically, referring to FIG. 11, there is only one bit string of 0s ranging from the bit number 30 up to bit number 27 via bit number 200. Therefore, the bit number 128 is decided to be at the center of the bit string of 0s. The controller 205 of the base apparatus 2A shifts the transmission timing by 128 slots such that the time position corresponding to the bit number 128 becomes new transmission timing. After the transmission timing change is completed, the base apparatus 2A transmits a radio condition inquiry signal to the mobile terminal again for confirmation (S512).

Figure 15:
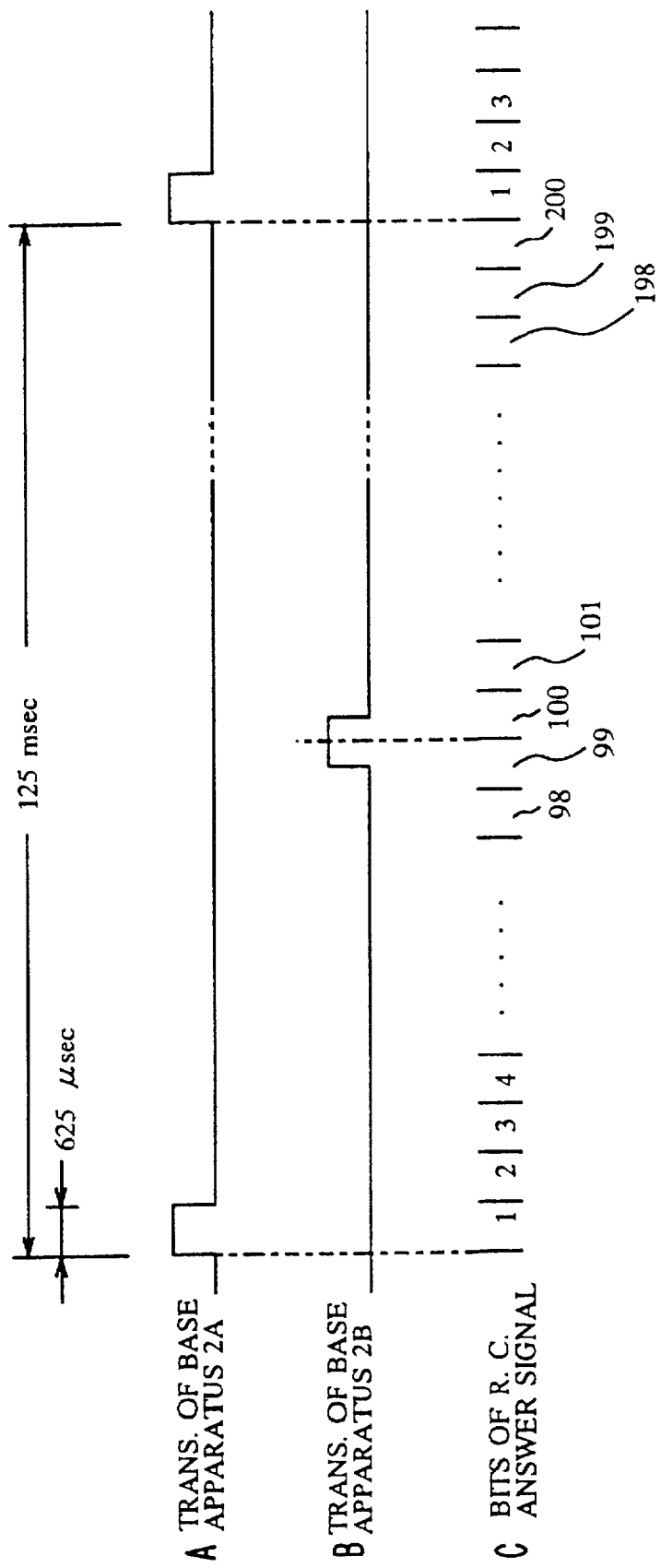
FIG. 15 is a time chart showing the transmission timing of base apparatuses 2A and 2B just after the transmission timing is changed.

As shown in FIGS. 15 and 16, the transmission timing change of the base apparatus 2A causes the transmission time position of the base apparatus 2B to be relatively changed to the center of the transmission time interval of the base apparatus 2A. Therefore, as shown in FIG. 16, the data bits of bit numbers 99 and 100 each have the value '1' and the other bits '0'.

In the above-mentioned embodiment, a system having two base apparatuses has been described by way of example. However, it is apparent that the same procedure as shown in FIG. 14 is also applied to another system having a plurality of base stations.

Moreover, in the above-mentioned embodiment, a radio condition inquiry signal causes a mobile terminal to detect the presence of radio wave and generate data bits for an answer signal. These operations may be performed independently by the mobile terminal itself. In this case, the mobile terminal judges whether a certain base apparatus should change its transmission timing or not. Only when the change in transmission timing is necessary, the mobile terminal may transmit a transmission timing change request signal together with a necessary radio condition data signal. It is also possible to use the dependent start of the above-mentioned operations on the base apparatus together with the independent start of the mobile terminal.

As described above in detail, in the method of controlling the transmission of a downgoing control signal according to the present invention, a mobile terminal detects the presence of radio wave of a downgoing control signal in each time slot in response to an inquiry signal received from a base station. The mobile terminal generates a radio condition answer signal which indicates the time positions of radio waves received within a predetermined interval, and transmits the radio condition answer signal to the base apparatus. The base apparatus, receiving the radio condition answer signal from the mobile terminal, detects time differences between the downgoing control signal sent by the base apparatus itself and other downgoing control signals sent by other base apparatuses. If at least one time difference becomes lower than a predetermined threshold, the base apparatus changes the transmission timing of the downgoing control signal such that the time difference becomes larger than the threshold. By performing such an operation at predetermined intervals, the differences in transmission time between base apparatuses are always kept larger than the threshold, resulting in no conflict with each other. Therefore, a stable TDMA mobile communication can be achieved.

What is claimed is:

1. In a TDMA mobile communications system in which a mobile terminal is located within service areas provided by a plurality of base stations, each said base station independently transmitting a control signal of a predetermined radio frequency at first predetermined intervals, a transmission control method comprising the steps of:

at said mobile terminal,
   a) synchronizing with a first control signal received from a first base station of said base stations to allocate a plurality of time slots according to said first control signal;
   b) determining whether a radio wave of said predetermined radio frequency exists in each said time slot to generate radio condition information of said time slots;
   c) transmitting said radio condition information to said first base station;

at said first base station,
   d) detecting a first time interval between adjacent time slots associated with said first base station and another base station during which said radio wave does not exist, on the basis of said radio condition information received from said mobile terminal; and
   e) changing in transmission timing of said first control signal when said first time interval is smaller than a predetermined value, such that said first time interval becomes larger than said predetermined value.

2. The transmission control method according to claim 1, wherein the step (b) comprises the steps of:
   detecting radio-field strength of said radio wave at a plurality of time positions included in each said time slot;
   comparing said radio-field strength with a predetermined threshold; and
   determining that said radio wave exists in a time slot of said time slots only when said radio-field strength is not smaller than said predetermined threshold at at least one of said time positions included in said time slot.

3. The transmission control method according to claim 1, wherein:
   said step (d) comprises the step of detecting time intervals between adjacent time slots associated with said base stations, respectively, on the basis of said radio condition information; and
   said step (e) comprises the steps of:
     detecting a second time interval larger than any other time interval among said time intervals when said first time interval is smaller than said predetermined value; and
     changing a transmission time position of said first control signal to the center of said second time interval.

4. The transmission control method according to claim 2, wherein:
   said step (d) comprises the step of detecting time intervals between adjacent time slots associated with said base stations, respectively, on the basis of said radio condition information; and
   said step (e) comprises the steps of:
     detecting a second time interval larger than any other time interval among said time intervals when said first time interval is smaller than said predetermined value; and
     changing a transmission time position of said first control signal to the center of said second time interval.

5. The transmission control method according to claim 1, further comprising the step of performing said steps (a)–(e) at second predetermined intervals.

6. The transmission control method according to claim 5, wherein said steps (a)–(e) are started up by said first base station.

7. The transmission control method according to claim 5, wherein said steps (a)–(e) are started up by said mobile terminal.

8. In a TDMA mobile communications system in which a mobile terminal is located within service areas provided by a plurality of base stations, each said base station independently transmitting a control signal of a predetermined radio frequency at first predetermined intervals, a transmission control method comprising the steps of:

at a first base station of said base stations,
  a) transmitting a first control signal to said mobile terminal at second predetermined intervals, said first control signal being a radio condition inquiry signal;

at said mobile terminal,
  b) synchronizing with said radio condition inquiry signal received from said first base station to allocate a plurality of time slots;
  c) determining whether a radio wave of said predetermined radio frequency exists in each said time slot to generate radio condition information of said time slots;
  d) transmitting a radio condition answer signal including said radio condition information to said first base station;

at said first base station,
  e) detecting a first time interval between adjacent time slots associated with said first base station and another base station during which said radio wave does not exist, on the basis of said radio condition information received from said mobile terminal; and
  f) changing in transmission timing of said control signal when said first time interval is smaller than a predetermined value, such that said first time interval becomes larger than said predetermined value.

9. The transmission control method according to claim 8, wherein the step (c) comprises the steps of:

detecting radio-field strength of said radio wave at a plurality of time positions included in each said time slot;

comparing said radio-field strength with a predetermined threshold; and determining that said radio wave exists in a time slot of said time slots only when said radio-field strength is not smaller than said predetermined threshold at one or more of said time positions included in said time slot.

10. The transmission control method according to claim 8, wherein:

said step (e) comprises the step of detecting time intervals between adjacent time slots associated with said base stations, respectively, on the basis of said radio condition information; and said step (f) comprises the steps of:
  detecting a second time interval larger than any other time interval among said time intervals when said first time interval is smaller than said predetermined value; and
  changing a transmission time position of said control signal to the center of said second time interval.

11. The transmission control method according to claim 9, wherein:

said step (e) comprises the step of detecting time intervals between adjacent time slots associated with said base stations, respectively, on the basis of said radio condition information; and said step (f) comprises the steps of:
  detecting a second time interval larger than any other time interval among said time intervals when said first time interval is smaller than said predetermined value; and
  changing a transmission time position of said control signal to the center of said second time interval.

12. A TDMA mobile communications system in which a mobile terminal is located within service areas provided by a plurality of base stations, each said base station independently transmitting a control signal of a predetermined radio frequency at first predetermined intervals, said mobile terminal comprising:
  synchronizing means for synchronizing with a first control signal received from a first base station of said base stations to allocate a plurality of time slots according to said first control signal;
  checking means for checking whether a radio wave of said predetermined radio frequency exists in each said time slot to generate radio condition information of said time slots; and
  transmitting means for transmitting said radio condition information to said first base station, and said first base station comprising:
  detecting means for detecting a first time interval between adjacent time slots associated with said first base station and another base station during which said radio wave does not exist, on the basis of said radio condition information received from said mobile terminal; and
  control means for changing in transmission timing of said first control signal when said first time interval is smaller than a predetermined value, such that said first time interval becomes larger than said predetermined value.

13. The system according to claim 12, wherein the checking means comprises:

a detector for detecting radio-field strength of said radio wave at a plurality of time positions included in each said time slot;

a comparator for comparing said radio-field strength with a predetermined threshold; and determining means for determining that said radio wave exists in a time slot of said time slots only when said radio-field strength is not smaller than said predetermined threshold at one or more of said time positions included in said time slot.

14. The system according to claim 12, wherein:

said detecting means comprises an interval detector for detecting time intervals between adjacent time slots associated with said base stations, respectively, on the basis of said radio condition information; and said control means comprises:
  a second detector for detecting a second time interval larger than any other time interval among said time intervals when said first time interval is smaller than said predetermined value; and
  changing means for changing a transmission time position of said first control signal to the center of said second time interval.

15. The system according to claim 13, wherein:

said detecting means comprises an interval detector for detecting time intervals between adjacent time slots associated with said base stations, respectively, on the basis of said radio condition information; and said control means comprises:
  a second detector for detecting a second time interval larger than any other time interval among said time intervals when said first time interval is smaller than said predetermined value; and changing means for changing a transmission time position of said first control signal to the center of said second time interval.

16. The system according to claim 12, wherein said mobile terminal transmits said radio condition information to said first base station at second predetermined intervals.

17. The system according to claim 16, wherein said mobile terminal transmits said radio condition information in response to a request of said first base station.

18. A TDMA mobile communications system in which a mobile terminal is located within service areas provided by a plurality of base stations, each said base station independently transmitting a control signal of a predetermined radio frequency at first predetermined intervals, said mobile terminal comprising:
synchronizing means for synchronizing with a radio condition inquiry signal received from a first base station of said base stations to allocate a plurality of time slots;
checking means for checking whether a radio wave of said predetermined radio frequency exists in each said time slot to generate radio condition information of said time slots; and
answer transmitting means for transmitting a radio condition answer signal including said radio condition information to said first base station, and said first base station comprising:
inquiry means for transmitting a first control signal to said mobile terminal at second predetermined intervals, said first control signal being said radio condition inquiry signal;
detecting means for detecting a first time interval between adjacent time slots associated with said first base station and another base station during which said radio wave does not exist, on the basis of said radio condition information received from said mobile terminal; and
control means for changing in transmission timing of said control signal when said first time interval is smaller than a predetermined value, such that said first time interval becomes larger than said predetermined value.

* * * * *